United States Patent [19]

Wood

[11] Patent Number: 4,775,800
[45] Date of Patent: Oct. 4, 1988

[54] POWER-SUPPLY APPARATUS
[75] Inventor: Peter Wood, Murrysville, Pa.
[73] Assignee: Westinghouse Elctric Corp., Pittsburgh, Pa.
[21] Appl. No.: 567,454
[22] Filed: Dec. 30, 1983
[51] Int. Cl.⁴ .............................................. H02V 9/00
[52] U.S. Cl. ....................................... 307/46; 307/66; 320/14
[58] Field of Search .................................. 307/44–46, 307/66, 130, 133, 48; 320/14, 59; 363/26

[56] References Cited

U.S. PATENT DOCUMENTS

| | | | |
|---|---|---|---|
| 3,384,806 | 5/1968 | Hartman | 322/2 |
| 3,421,067 | 1/1969 | Wilson et al. | 320/14 |
| 3,696,286 | 10/1972 | Ule | 320/40 |
| 3,699,352 | 10/1972 | Silver | 307/75 |
| 3,896,368 | 7/1975 | Rym | 340/572 |
| 3,909,685 | 9/1975 | Baker et al. | 318/139 |
| 3,950,689 | 4/1976 | Jamison | 320/14 |
| 4,016,473 | 4/1977 | Newman | 320/14 |
| 4,017,779 | 4/1977 | McDonald et al. | 320/15 |
| 4,079,495 | 3/1978 | Hufnagel | 363/71 |
| 4,134,057 | 1/1979 | Portmann | 320/61 |
| 4,175,249 | 11/1979 | Gruber | 323/271 |
| 4,204,147 | 5/1980 | Larrabee | 323/257 |
| 4,276,590 | 6/1981 | Hansel et al. | 363/71 |
| 4,277,692 | 7/1981 | Small | 307/66 |
| 4,281,278 | 7/1981 | Bilsky et al. | 320/13 |
| 4,287,465 | 9/1981 | Godard et al. | 320/56 |
| 4,306,183 | 12/1981 | Wright | 320/39 |
| 4,311,920 | 1/1982 | Smollinger | 307/66 |
| 4,323,788 | 4/1982 | Smith | 307/66 |
| 4,327,318 | 4/1982 | Kwon et al. | 320/39 |

Primary Examiner—A. D. Pellinen
Assistant Examiner—Todd E. DeBoer
Attorney, Agent, or Firm—H. Diamond

[57] ABSTRACT

Power supply apparatus including a generator of electrical energy, such as fuel cells, solar cells, MHD generators or the like, in which a storage battery is connected to the generator and to the load for supplementing the generator when the load exceeds its output or for storing energy from the generator when the generator output exceeds the load. A differentially rated, current-sourced, dual converter is interfaced between the storage battery and the generator for controlling the flow of power into or out of the battery.

3 Claims, 3 Drawing Sheets

POWER-SUPPLY APPARATUS

CROSS-REFERENCE TO RELATED APPLICATIONS

Application Ser. No. 435,808 filed Oct. 21, 1982 to David E. Dickey et al for *Fuel Cell Power Conditioning Interface Circuitry* (now abandoned) and U.S. Pat. No. 4,472,641 granted Sept. 18, 1984 to David E. Dickey et al for *Power Supply Apparatus*, both assigned to Westinghouse Electric Corporation, are incorporated herein by reference.

BACKGROUND OF THE INVENTION

This invention relates to power-supply apparatus in which generators such as fuel cells, solar cells, particularly solar photovoltaic cells, magneto hydrodynamic generators or the like supply power to a load. The invention has particular relationship to such apparatus which includes a storage battery for storing energy from the generator when the output of the generator exceeds the loading or for supplementing the energy supplied by the generator when the loading exceeds the output of the generator.

A dramatic increase in the use of the above-mentioned generators is anticipated during the next few years. In particular it is expected that there will be wide use of small power supply apparatus of this type for private residences. Such small power-supply apparatus may include generators of the different types mentioned above but predominantly the generators will be of the solar photovoltaic type. Basically this apparatus includes the generator, typically a photovoltaic array, and a power conditioner; i.e. an inverter (DC-to-AC converter). It is contemplated that normally the residential power-supply apparatus will supplement the power supplied by a public utility. But in some instance operation independently of the utility will be necessary, or, as in some areas in Saudi Arabia, where such generator apparatus is in use, power from a public utility will not be available at all. In such power-supply installations a storage battery in addition to the generator and the inverter is necessary. There is need for an interface between the generator and the battery in such installations. This necessity arises predominantly from the voltage differential which exists at the output of the generator. In the case of a solar photovoltaic generator array such differential may be caused by differences in the light incident on the array on different days and at different times of any day. In the absence of an interface full use of the energy from the generator is difficult, if not impossible. The interface is also necessary because of differences in the loading of the generator.

Attempts, in accordance with the teachings of the prior art, have been made to overcome the problems raised by the variation of the power or voltage output of the generator and the load variations. It has been proposed that the battery be connected directly across the output of the generator (through blocking diodes). This approach dispenses with the interface altogether and has the disadvantages mentioned above. A second proposal is to interpose, between the generator and the battery, a DC-to-DC converter; i.e., a converter having the full rating of the generator. This proposal is costly. It is also inefficient because the interface converter absorbs a substantial portion of the generator power. A further proposal is to connect a full-rated auxiliary inverter (DC-to-AC converter) between the battery and the input to the load; i.e., between the battery output and the AC output of the main inverter connected to the generator. This proposal is an improvement over the second proposal as regards the energy delivered from the generator to the load but it suffers from the same disadvantages as the first proposal. Its cost is high and its efficiency is low.

It is an object of this invention to overcome the disadvantages and drawbacks of the prior art and to provide power supply apparatus of the type described above that shall effectively and efficiently and at low cost permit voltage differentials to exist between the storage battery and the generator while permitting controlled current to flow into or out of the battery.

SUMMARY OF THE INVENTION

In accordance with this invention power-supply apparatus is provided in which a differentially rated converter is interfaced between the generator and the storage battery. Specifically the converter is a dual converter conducting current to or from the battery during successive half cycles of AC supply. The converter is a current-sourced converter. The use of a differentially-rated voltage-sourced converter as an interface is also within the scope of equivalents of this invention but such a converter is more costly and less efficient than a current sourced converter. The maximum voltage at which the converter operates; i.e., its voltage capability is substantially equal to the maximum differential voltage of the generator. Typically, for a photovoltaic array, the maximum voltage differential is ±20% of the mean or rated or nominal voltage; a total of 40%. Typically the voltage output of a generator may vary between 200 and 2000 volts.

The differential at the lower range is ±40 volts; i.e., $(\pi/2) \times 40 = 62.8$ volts peak and $$\frac{\pi}{2\sqrt{2}} \times 40 = 44.6 \text{ volts RMS.}$$

For 2000 volts the peak voltage is 628 volts and the RMS voltage 446 volts.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which.

DETAILED DESCRIPTION OF EMBODIMENTS

Figure 1:
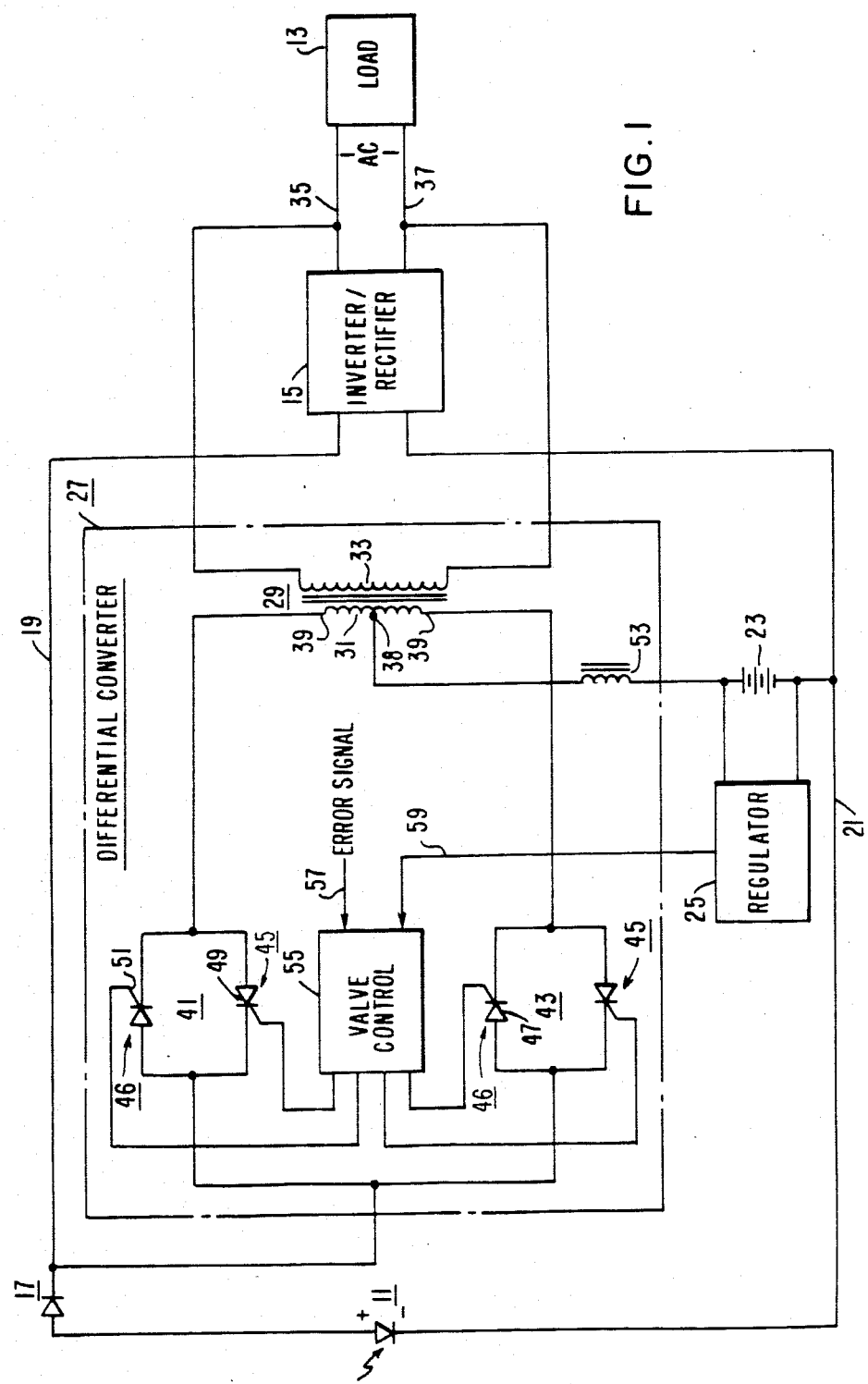
FIG. 1 is a schematic showing an embodiment of this invention.

The apparatus shown in FIG. 1 includes a generator 11 of electrical energy, which may be a fuel cell, solar cell or MHD generator. The generator 11 supplies power to a load 13 through an inverter 15. By selected firing of its valves (not shown) the inverter 15 may be operated as a rectifier as indicated. The generator 11 is connected to the inverter 15 through blocking diode (or an array of diodes) 17 and buses 19 and 21. The apparatus also includes a storage battery 23. A conventional regulator 25 is connected to the battery 23 to prevent the battery from being overcharged.

A differential-rated, current-sourced dual converter 27 is interfaced between the generator 11 and the battery 23. The converter includes a transformer 29 having a primary 33 and an intermediate-tapped secondary 31. The primary 33 is supplied from the alternating current output buses 35 and 37 through which the load 13 is supplied. The winding 31 feeding the interface converter could be a winding of a dedicated transformer 29 as shown or an auxiliary winding on the isolation transformer (not shown) of the inverter 15. Under certain circumstances the transformer 29 may be supplied from a source independently of the apparatus. The nominal voltage between the intermediate tap 38 of secondary 31 and each end terminal 39 is substantially equal to the voltage differential of the generator 11; i.e., the variation of the voltage range of the generator from its mean or from the nominal voltage of the battery. Typically this differential varies plus or minus 40 volts for a 200 volt generator and plus or minus 400 volts for a 2000 volt generator.

The converter 27 also includes two pairs 41 and 43 of asymmetrically conductive valves 45 and 46 connected in inverse parallel. The valves 45 and 46 of each pair are typically silicon-controlled rectifiers or thyristors. Each valve has an anode 47, a cathode 49 and a gate 51. It is assumed that positive current flows from the anode to the cathode. The electrode represented by the arrow head is assumed to be the positive electrode and that represented by the line, the negative electrode. The same convention is assumed with respect to the generator 11 and the diode 17. The battery 23 is connected between the intermediate tap 37 and negative bus 21 through an inductive reactor or choke 53. Each end terminal 39 is connected through a pair 41 and 43 of inversely connected valves 45 and 46 to the positive bus 19. The gates 51 of the valves 45 and 46 are connected to a valve control 55 which controls the conductivity of the valves in dependence upon the voltage of the generator 11 or other related parameters. The command is derived through an error input 57 that supplies the error signal which depends on the mode of control selected. The valve control 55 also receives a signal from the regulator 25 through conductor 59 to disable valves 46 when the battery 23 is fully charged. The valve-control 55 is part of the converter 27 but in FIGS. 3 and 4 it is shown as outside of the converter to facilitate understanding of the invention.

Figure 2:
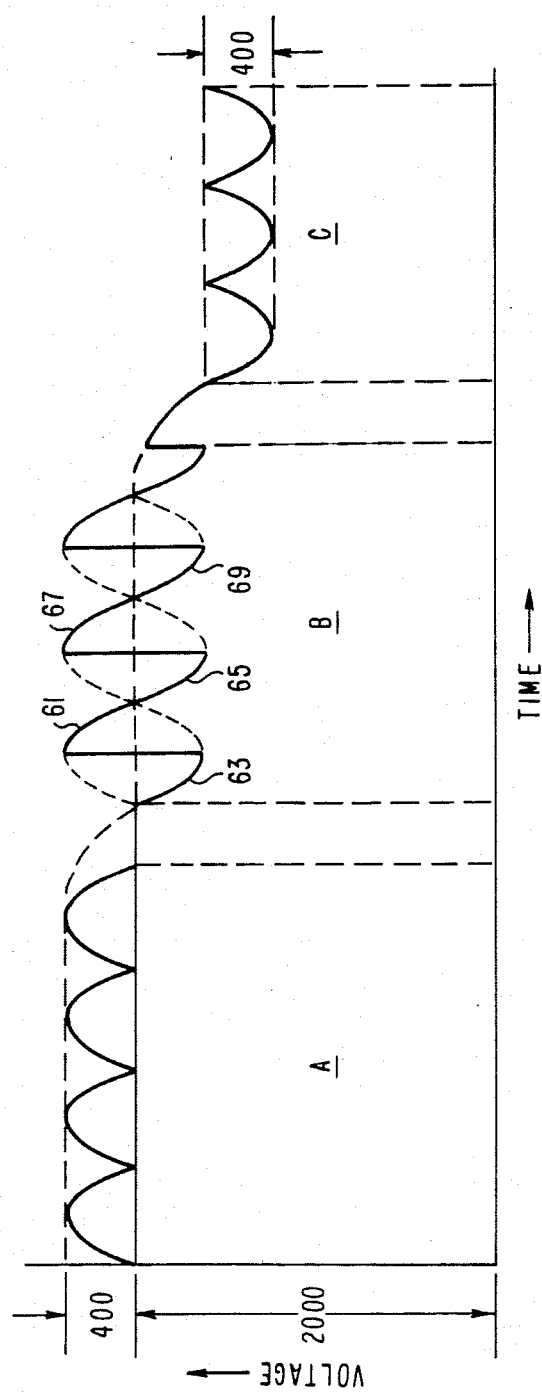
FIG. 2 is a graph illustrating the operation of FIG. 1.

The operation of the apparatus shown in FIG. 1 will now be described with reference to FIG. 2. In FIG. 2 voltage is plotted vertically and time horizontally. It is assumed that the nominal voltage produced between buses 19 and 21 by generator 11 and the nominal battery voltage is 2000 volts. It is also assumed that the voltage between the buses 19 and 21 may vary by ±20%; i.e., between 2400 volts and 1600 volts. The nominal voltage between each end terminal 39 and the intermediate tap 37 of secondary 31 is 400 volts.

Sections A, B and C of FIG. 2 correspond to three modes of voltage output of generator 11; maximum overvoltage, nominal voltage, and minimum voltage, i.e., maximum undervoltage. The valves 45 and 46 are controlled so that the flow of current compensates for these variations in the manner desired. The conducting intervals of the valves are illustrated by the sections of the sine-wave curves shown in FIG. 2 which are drawn in heavy full lines.

The function of the transformer 29 is to equalize the voltage derived from source 11 and the battery voltage. When the source voltage is higher than the voltage of battery 23, the valves 45 or 46 are fired near the beginning of the half period when the terminals 39 are positive with respect to tap 37 and when the battery voltage is higher than the voltage of source 11, the valves 45 or 46 are fired towards the ends of the half cycles when the terminals 39 are positive with respect to tap 37. For example, if the source voltage is 2400 volts and the battery voltage is 2000 volts, the valves 45 and 46 are fired so that the secondary 31 supplies the additional plus 400 volts to the battery 23, and if the source voltage is 1600 volts and the battery voltage is 2000 volts, the valves are fired so that the secondary 31 subtracts 400 volts from the voltage of battery 23. The selection of the valves 45 or 46 for firing is determined by whether the battery is to be charged from the load 13 or is to be discharged into the load.

Now assume that the voltage of source 11 is lower than the voltage of battery 23 and that it is desired to charge the battery. In this case, valves 46 are rendered conducting near the ends of the positive half-periods when terminals 39 are each in its turn, positive with respect to tap 37. This operation is represented by Section C of FIG. 2. Current flows from bus 19, through upper valve 46, the upper half of secondary 31, choke 53, battery 23 to bus 21. During the succeeding half period current is conducted in the same circuit except through the lower valve 46 and the lower half of secondary 31. Current is conducted during the negative half period C because the net voltage around the above circuits is such as to drive current through the valves 46. If it is desired to supply the load 13 from the battery 23, valves 45 are fired near the ends of the positive half-periods when the terminals 39 are positive relative to tap 37. In this case, when upper valve 45 is conducting, current flows from the battery through choke 53, the upper half of secondary 39, upper valve 45, bus 19, inverter/rectifier 15, bus 21, battery 23. During the alternate half period, current flows in the following circuit: 23, lower half of secondary 31, lower valve 45, 19, 15, 21, 23. In this case, i.e., when the source voltage is lower than battery voltage, power flows out of the transformer 29 when the battery is being charged because the interface converter voltage subtracts from the battery voltage. In this case also the net voltage around the traced circuits has a polarity such as to drive the current through the valves 45. Power flows into the transformer 29 when the battery 23 is being discharged because the interface converter voltage subtracts from the battery voltage as before but the flow of current is reversed.

Now assume that the source voltage is higher than the battery voltage. In this case, the valves 46 or 45 are fired near the beginnings or early in the positive half periods (39–37) as represented by Section A of FIG. 2. When the battery is to be charged, current flows in the following circuit; 19, upper 46, upper 39, 38, 53, 23, 21 or during alternate half periods in current 19, lower 46, lower 39, 38, 53, 23, 21. Power flows into the transformer 29. When the battery 23 is to be discharged, valves 45 are fired early in the positive half periods. Current flows alternately in circuit 23, 53, 38, upper 39, upper 45, 19, 15, 21, 23 and in circuit 23, 53, 38, lower 39, lower 45, 19, 15, 21, 23. Power flows out of transformer 29.

When the source voltage and battery voltage are equal, the valves 46 are fired at the 90° angles in the positive half-periods when the battery is charged or the valves 45 are fired at the 90° angles in the positive half periods when the battery is discharged. This operation is represented by Section B of FIG. 2. No power is drawn from, or supplied to, the transformer.

Figure 3:
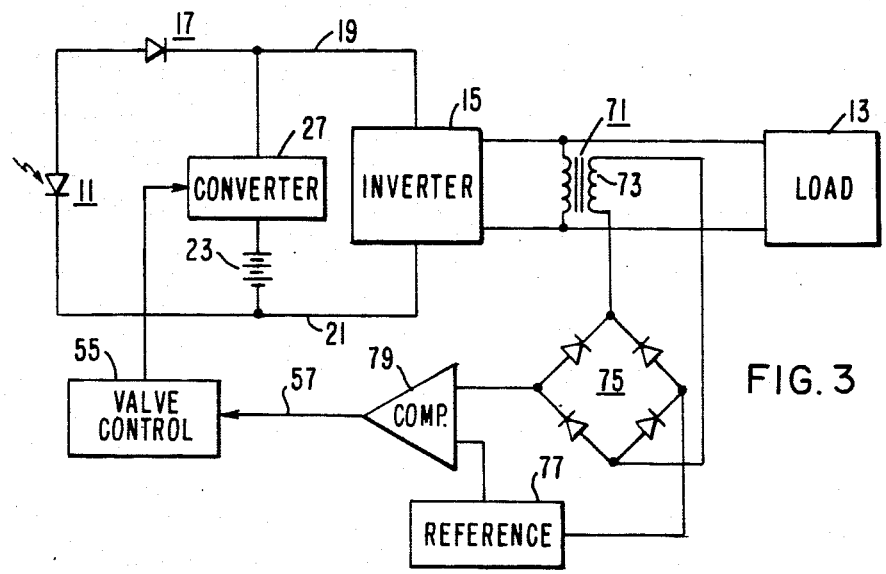
FIG. 3 is a block diagram showing the use of this invention to control the input load voltage.

In the apparatus shown in FIG. 3 a signal measuring the supply voltage across the load 13 is derived from a transformer 71. The secondary 73 of this transformer is connected to a rectifier 75. The direct-current voltage output of the rectifier is compared to a voltage from a reference 77 in a comparator 79. The error signal derived from comparator 79 is impressed on error-signal input 57 to control the firing of the valves 45 or 46 depending on whether the battery 23 is charged or discharged so that the voltage input to the load 13 is maintained at the desired magnitude.

Figure 4:
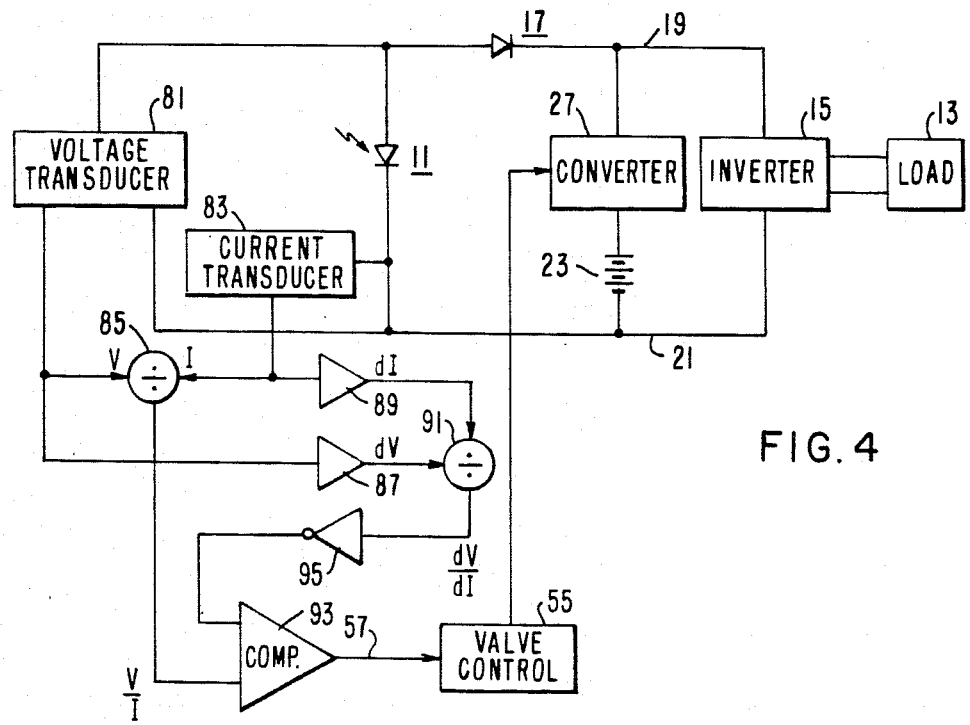
FIG. 4 is a block diagram showing the use of this invention to maintain the output power of the generator at its maximum magnitude.

The apparatus shown in FIG. 4 includes a transducer 81 measuring the voltage output, V, of generator 11 and a transducer 83 measuring the current output, I, of this generator. The signals derived from the transducers 81 and 83 are impressed on a divider 85 whose output is (V/I). The signals V and I are also differentiated by separate differentiators 87 and 89 and the outputs of the differentiators dV and dI are impressed on a divider 91 whose output is dV/dI. The output of divider, dV/dI, is impressed on a comparator 93 through an inverter 95. The comparator 93 solves the differential equation.

$$(dV/dI) = -(V/I)$$

which is the solution of the equation $d(VI)=0$ for maximum power. The output of the comparator 93 is impressed on the error input 57 of the valve control 55. The valves 45 or 46 are controlled so as to maintain the power output of the generator 11 at a maximum.

While preferred embodiments of this invention have been disclosed herein, many modifications thereof are feasible. This invention is not to be restricted except insofar as is necessitated by the spirit of the prior art.

I claim:

1. Apparatus used in supplying power to a load, the said apparatus including a generator of electrical energy, the output voltage of said generator being variable over a limited range, a storage battery connected to said generator and to said load used in storing energy from said generator when the output of said generator exceeds the demand of said load and used in supplying energy to said load when the output of said generator is insufficient to supply the demand of said load, a differential-rated converter interfaced between said generator and said storage battery, said differential-rated converter having a power supply having a voltage approximately equal to the magnitude of said limited range, said differential-rated converter including:

(a) auxiliary means used in supplying alternating current for said converter, said auxiliary means having an intermediate terminal and opposite end terminals, and having an output voltage between said end terminals approximately equal to said limited range, (b) inductive-reactance means connecting said storage battery between an output conductor of said generator and said intermediate terminal, and (c) a pair each of separately controllable asymmetrically conductive valves interposed in inverse parallel between each of said end terminals and the opposite output conductor of said generator, and said apparatus also including means, connected to said converter, used in controlling said converter to set said converter to conduct the flow of power into or out of said battery.

2. The apparatus of claim 1 including means, interposed between the output conductors from the generator and the load, which means is used to convert the output of the generator into alternating current for the load and which means has an output connected to the load, and also including means connecting the alternating current-supply means of the auxiliary means to derive its alternating current from said last-named output of the generator-output converting means.

3. Apparatus used in supplying power to a load, the said apparatus including a generator of electrical energy, the output voltage of said generator being variable over a limited range, a storage battery connected to said generator and to said load used in storing energy from said generator when the output of said generator exceeds the demand of said load and used in supplying energy to said load when the output of said generator is insufficient to supply the demand of said load, a differential-rated converter interfaced between said generator and said storage battery, said differential rated converter having a power supply having a voltage approximately equal to the magnitude of said limited range, and means, connected to said converter, used in controlling said converter to set said converter to conduct the flow of power into or out of said battery, said controlling means also including means, connected to said converter, used in maintaining the power output of said generator substantially at a maximum.

* * * * *